United States Patent
Lee (10) Patent No.: US 11,584,286 B2
(45) Date of Patent: Feb. 21, 2023

(54) LOADING MODULE AND DELIVERY ROBOT EQUIPPED WITH SAME

(71) Applicant: LG ELECTRONICS INC., Seoul (KR)

(72) Inventor: Don Geun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 611 days.

(21) Appl. No.: 16/574,521

(22) Filed: Sep. 18, 2019

(65) Prior Publication Data

US 2020/0023765 A1    Jan. 23, 2020

Related U.S. Application Data (63) Continuation of application No. PCT/KR2019/004379, filed on Apr. 11, 2019.

(51) Int. Cl.
| | | |
|---|---|---|
| *B60P 3/00* | (2006.01) | |
| *E05F 15/73* | (2015.01) | |
| *G06Q 10/08* | (2012.01) | |
| *G06Q 10/083* | (2023.01) | |
| *G05D 1/02* | (2020.01) | |

(52) U.S. Cl.
CPC .............. *B60P 3/007* (2013.01); *E05F 15/73* (2015.01); *G06Q 10/0838* (2013.01); *E05F 2015/767* (2015.01); *E05Y 2900/50* (2013.01); *G05D 1/0212* (2013.01)

(58) Field of Classification Search
CPC . B25J 11/008; B25J 9/0009; B25J 9/08; B25J 9/161; B25J 9/1679; B25J 9/1697; B25J 11/0005; B25J 19/02; B60P 3/007; E05F 15/73; E05F 2015/767; E05Y 2900/05; G05D 1/0212; G06Q 10/0838
See application file for complete search history.

(56) References Cited

U.S. PATENT DOCUMENTS

| | | | |
|---|---|---|---|
| 8,948,914 B2 * | 2/2015 | Zini | G05B 19/41895 |
| | | | 700/258 |
| 9,741,010 B1 | 8/2017 | Heinla | |
| | | (Continued) | |

FOREIGN PATENT DOCUMENTS

| | | |
|---|---|---|
| JP | 2016-156922 | 9/2016 |
| KR | 10-0310617 | 10/2001 |
| | (Continued) | |

OTHER PUBLICATIONS

International Search Report dated Jan. 6, 2020 issued in Application No. PCT/KR2019/004379.

*Primary Examiner* — Geepy Pe
*Assistant Examiner* — Paulo Roberto Gonzalez Leite
(74) *Attorney, Agent, or Firm* — Ked & Associates, LLP (57) ABSTRACT

A delivery robot equipped with a loading module is disclosed. The delivery robot includes a communicator for communicating with a control center or a mobile terminal within a control range of an article sender, one or more sensing units, an inputter for receiving information on an article and destination information on the article, a memory for storing a delivery list, a display, and a controller. The delivery robot may be equipped with artificial intelligence and may also perform 5G (generation) communication. Thus, user convenience can be improved.

7 Claims, 10 Drawing Sheets

(56) References Cited

U.S. PATENT DOCUMENTS

2006/0037969 A1* 2/2006 Jennings .............. B67D 1/0041
                                                        222/129.1
2018/0300676 A1* 10/2018 Peterson ............ G06Q 10/0832
2020/0209865 A1* 7/2020 Jarvis ............... G06Q 10/08355

FOREIGN PATENT DOCUMENTS

| KR | 10-1691329      | 12/2016 |
| KR | 10-2018-0080499 | 7/2018  |
| KR | 10-2018-0085324 | 7/2018  |
| KR | 10-2018-0123298 | 11/2018 |

* cited by examiner

SENDER

RECIPIENT

[FIG. 12]

LOADING MODULE AND DELIVERY ROBOT EQUIPPED WITH SAME

CROSS-REFERENCE TO RELATED APPLICATION

This application is a continuation application of PCT Patent Application No. PCT/KR2019/004379, entitled "Loading module and delivery robot equipped with same," filed on Apr. 11, 2019, in the World Intellectual Property Organization, the entire disclosure of which is incorporated herein by reference.

BACKGROUND

1. Field of the Invention

The present disclosure relates to a delivery robot, and more particularly, to a robot which delivers articles loaded on a loading module to a destination.

2. Description of Related Art

Robots have been developed for industrial use to act as part of factory automation. In recent years, the field of applications of robots has been expanded. In particular, robots which may be conveniently used in everyday life, as well as medical robots and aerospace robots are being developed.

Korean Patent Application Publication No. 20180080499A, entitled "Robot for Airport and Method Thereof" discloses a robot for airport including a communication unit, an object recognition unit, a display unit for receiving a destination, a receiving portion for receiving loads, and a control unit for controlling the robot for airport, and may carry a user's luggage to a destination.

However, the robot for airport may only carry luggage to one destination and may not carry multiple pieces of luggage to multiple destinations.

Korean Patent Registration No. 100310617B, entitled "Method of Producing Motion Planning for Troweling Robot" discloses a troweling robot that may efficiently search for a moving path in consideration of obstacles when searching for a path between an origin and a destination.

However, since the troweling robot searches for only the shortest path from the origin to the destination, the troweling robot cannot efficiently load various articles and cannot deliver the various loaded articles to various destinations.

SUMMARY OF THE INVENTION

The present disclosure is directed to providing a robot equipped with a loading module for efficiently loading a plurality of articles.

The present disclosure is further directed to providing a robot which timely delivers a plurality of loads to an appropriate location.

The present disclosure is still further directed to providing a delivery robot which receives article information and destination information on an article inputted by a person, without needing to input information manually, via a code input method.

The present disclosure is still further directed to providing a delivery robot which safely loads an article requiring a specific storage environment and authenticates an article recipient using an additional authentication procedure.

The present disclosure is still further directed to providing a delivery robot which loads together all articles having a same destination.

The present disclosures are not limited to those mentioned above. A person skilled in the art may clearly understand, from the following description, other disclosures not mentioned.

A delivery robot according to an embodiment of the present disclosure may include a loading module for efficiently loading a plurality of articles by appropriately rotating an article receiving portion in which a plurality of articles are received.

The loading module may include: an article receiving portion which includes one or more separating members extending in a circumferential direction from a central axis, and a plurality of receiving spaces formed by the separating members; a main body in which the article receiving portion is located and a body doorway is formed; a rotation driving unit for rotating the article receiving portion; a door for opening and closing the body doorway; and a door driving unit connected to the door to open and close the door.

The delivery robot according to an embodiment of the present disclosure may include a control module for causing a loading module to timely deliver a plurality of articles to an appropriate location.

To this end, the control module of the delivery robot may select, from among multiple receiving spaces, a receiving space in which an article is to be loaded, and reveal the selected receiving space based on inputted article information and destination information on the article.

In addition, the control module may store a delivery list for defining a delivery order of a plurality of articles, wherein the delivery list may include at least one of article information, destination information on the articles, and information on the receiving space in which the article is loaded.

The delivery robot according to an embodiment of the present disclosure may safely load an article requiring a specific storage environment and authenticate an article recipient using an additional authentication procedure.

Specifically, when a specific article is a dangerous article and a video call with a mobile terminal within a control range of an article sender is connected after the specific article arrives at a destination, a control module may take an image of the article recipient, transmitting the image of the article recipient to the mobile terminal via a communication unit, showing an image of an article sender on a display of the delivery robot, and causing a receiving space having the specific article therein to become revealed when an additional consent command is received from the article sender via the communication unit.

The delivery robot according to an embodiment of the present disclosure may load together all articles having a same destination. To this end, a control module of the delivery robot may reveal a receiving space in which a pre-loaded article is located when inputted destination information on the article matches destination information on the pre-loaded article.

The technical solution of the present disclosure is not limited to that mentioned above. A person skilled in the art may clearly understand, from the following description, other technical solutions not mentioned.

According to various embodiments of the present disclosure, the following effects can be obtained.

First, a delivery robot equipped with a loading module for efficiently loading a plurality of articles can be provided.

Second, user convenience can be improved by providing a robot which timely delivers a plurality of articles to an appropriate location.

Third, article information and destination information on an article are automatically inputted via a code input method so that user convenience can be provided and user input errors can be prevented.

Fourth, an article requiring a specific storage environment can be safely delivered to a destination, and the risk delivery errors can be prevented since a dangerous article is delivered via additional certification.

DETAILED DESCRIPTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
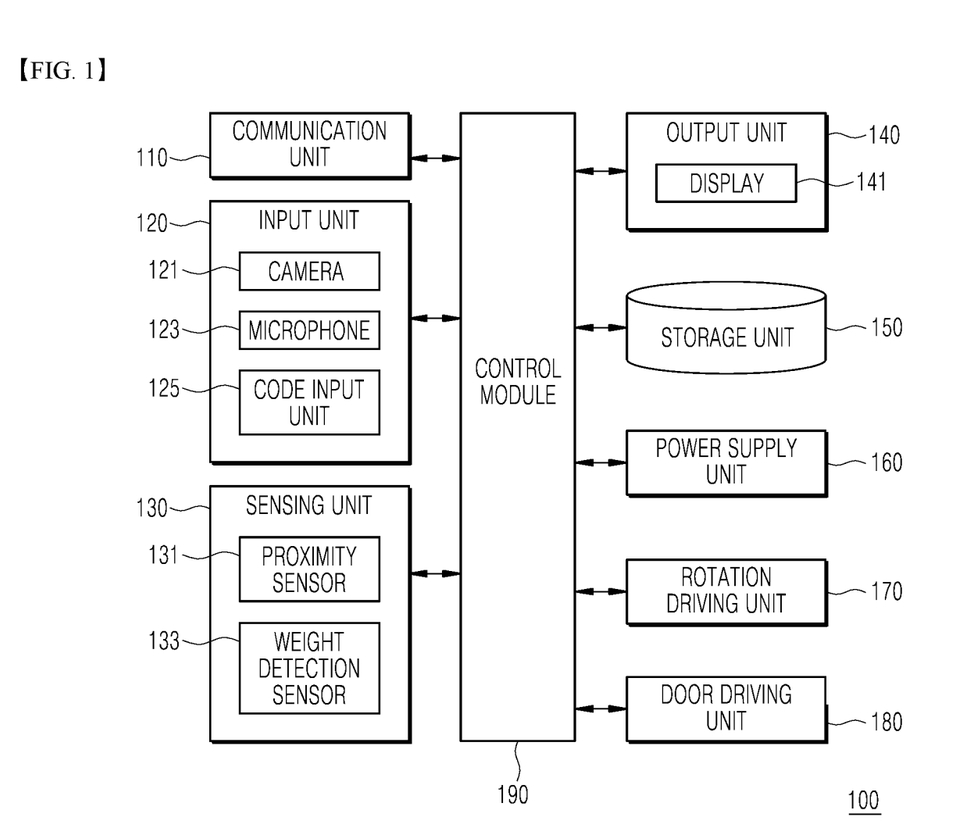
FIG. 1 is a block diagram illustrating a configuration of a delivery robot, according to an embodiment of the present disclosure.

FIG. 1 is a block diagram showing a configuration of a delivery robot 100 according to an embodiment of the present disclosure. The delivery robot 100 may include a communication unit 110, an input unit 120, a sensing unit 130, an output unit 140, a storage unit 150, a power supply unit 160, a rotation driving unit 170, a door driving unit 180, and a control module 190. The components shown in FIG. 1 are not essential for implementing the delivery robot 100, and thus the delivery robot 100 shown in FIG. 1 may have fewer or more components than those listed above.

More specifically, among the components described above, the communication unit 110 may include one or more wired or wireless communication modules which enable communication between the delivery robot 100 and a mobile terminal, between the delivery robot 100 and a control center, and between the delivery robot 100 and a device having a communication module. The communication unit 110 may include a mobile communication module, a near field communication module, and the like. In some implementations, the communication unit 110 may be implemented a communicator. In some implementations, the communication unit 110 comprises at least one of a communicator or consists of at least one of a communicator.

The input unit 120 may include: a camera 121 or image input unit from which the input unit 120 receives an image signal; a microphone 123 or audio input unit from which the input unit 120 receives an audio signal; a code input unit 125 for receiving a bar code or a quick response (QR) code; a user input unit (e.g., a touch key, a mechanical key) for receiving information from a user, and the like. Voice or image data collected by the input unit 120 may be analyzed and processed as a user's control command. In some implementations, the input unit 120 may be implemented inputter or input interface. In some implementations, the input unit 120 comprises at least one of inputter or consists of at least one of inputter. In some implementations, the input unit 120 may be configured to input data and signals.

Here, the code input unit 125 may receive, via a tagging or scanning operation, information on an article to be delivered and destination information on the article. Accordingly, the procedure of manually inputting the article information or destination information on the article may be omitted, incorrectly inputted errors may be prevented, and user convenience may be improved.

The control module 190 may recognize the article information and destination information on the article, which are inputted via the code input unit 125, and the code input unit 125 may be disposed in one area of a display 141.

The sensing unit 130 may include one or more sensors for detecting at least one of information on the delivery robot 100 itself, surrounding environment information around the delivery robot 100, and user information. For example, the sensing unit 130 may include at least one of a proximity sensor 131; a weight detection sensor 133; an illumination sensor; a touch sensor; an acceleration sensor; a magnetic sensor; a G-sensor; a gyroscope sensor; a motion sensor; an RGB sensor; an infrared sensor; a finger scan sensor; an ultrasonic sensor; an optical sensor, such as camera 121; a microphone 123; a code input unit 125, such as a bar or QR code input unit); a battery gauge; an environment sensor (e.g., a barometer, a hygrometer, a thermometer, a radiation detection sensor, a heat detection sensor, a gas detection sensor), and a chemical sensor (e.g., an electronic nose, a healthcare sensor, a biometric sensor). Meanwhile, the delivery robot 100 disclosed in this specification may combine and utilize information detected by at least two sensors among the sensors listed above. The sensing unit comprises at least one of a sensor.

Here, the weight detection sensor 133 may be equipped in each receiving space in which articles are loaded, and may recognize whether the articles are loaded in or unloaded from the receiving space. The weight detection sensor 133 may detect that a specific article is loaded on the delivery robot 100 under the control of the control module 190. When loading is detected, the control module may determine that the article has been loaded. The receiving space comprises storing space.

In addition, the control module 190 may accurately measure the weight of the specific article using the weight detection sensor 133. Specifically, the control module 190 may calculate the weight for each receiving space. The control module 190 may determine that a particular article has been successfully delivered to an article recipient when the total weight of the articles in the receiving space is reduced by the weight of the particular article. The receiving space comprises at least one of a storing place.

The output unit 140 may include at least one of a display 141 (multiple displays being applicable), one or more light emitting devices, a voice output unit, and a haptic module for generating a visual output, an audio output, a tactile output, and the like. The display 141 may be formed to be layered with the touch sensor or may be formed integrally with the touch sensor, so that the display 141 may be implemented as a touch screen. The touch screen may function as a user input unit for providing an input interface between the delivery robot 100 and a user, and at the same time, may provide an output interface between the delivery robot 100 and the user. In addition, the code input unit 125 may be disposed on the display 141.

The storage unit 150 stores data which enables the delivery robot 100 to perform various functions. The storage unit 150 may store a plurality of application programs or applications running on the delivery robot 100, data for operation of the delivery robot 100, and commands. At least some of these application programs may be downloaded from an external server via wireless communication. In addition, the storage unit 150 may store information on users wanting to interact with the delivery robot 100. The user information may be used to identify a recognized user. The storage unit 150 comprises at least one of a memory.

The storage unit 150 may store a delivery list of articles delivered by the delivery robot 100. The delivery list may include article information, destination information on the article, information on the receiving space, information on an article sender, information on the article recipient, and the like, wherein information in the delivery list may be sorted and stored by being prioritized based on the distance to a destination or other options. The control module 190 may update the delivery list each time an article is loaded in or unloaded from the receiving space.

Here, article information may include information on the article itself, expiration date information, information on a special storage environment, information on properties of the article, and the like. The destination information on the article may include information on the destination, information on stops, and information on a high priority destination. Information on the receiving space may include information that a specific article has been loaded in a specific space, information on the weight of each of the articles loaded in each receiving space, and information on the total weight of the articles loaded in the receiving space. Information on the article sender may be inputted via user input and may be automatically stored by user recognition via camera 121.

Under the control of the control module 190, the power supply unit 160 is supplied with external power or internal power, or both, and supplies power to each component of the delivery robot 100. The power supply unit 160 includes a battery, which may be a built-in battery or a replaceable battery. The battery may be charged via a wired or wireless charging scheme, wherein the wireless charging scheme may include a magnetic induction scheme or a magnetic resonance scheme. The power supply unit 160 comprises at least one of a power supplier.

When the battery of the power supply unit 160 is insufficient to carry out a delivery operation, the control module 190 may cause a moving module to move to a predetermined charging station to charge the battery.

The rotation driving unit 170 is a module for rotating an article receiving portion 300 (see FIG. 5) to receive articles and may include a motor for rotating a fixed shaft disposed in a direction passing through a central axis of the article receiving portion. The rotation driving unit 170 comprises at least one of a rotation driver or consists of at least one of a rotation driver. The rotation driver which is configured to rotate an article receiving portion 300 (see FIG. 5) to receive articles and may include a motor for rotating a fixed shaft disposed in a direction passing through a central axis of the article receiving portion. In some implementations, the rotation driving unit 170 may be implemented a rotation driver. In some implementations, the rotation driving unit 170 comprises at least one of a rotation driver or consists of at least one of a rotation driver.

The door driving unit 180 is a module for causing a door to open and close the doorway of the delivery robot 100, and may include a door driving mechanism and an electromotive door driving unit for actuating the door driving mechanism. The door driving unit 180 comprises at least one of a door driver or consists of at least one of a door driver. The door driver which is configured to cause a door to open and close the doorway of the delivery robot 100. In some implementations, the door driving unit 180 may be implemented a door driver. In some implementations, the door driving unit 180 comprises at least one of a door driver or consists of at least one of a door driver The control module 190 corresponds to a controller for regulating, in various ways, the components mentioned above. The control module 190 may have the article delivered to a destination based on article information and destination information on the article, which are inputted via the code input unit 125. The control module 190 comprises at least one of a controller.

Figure 2:
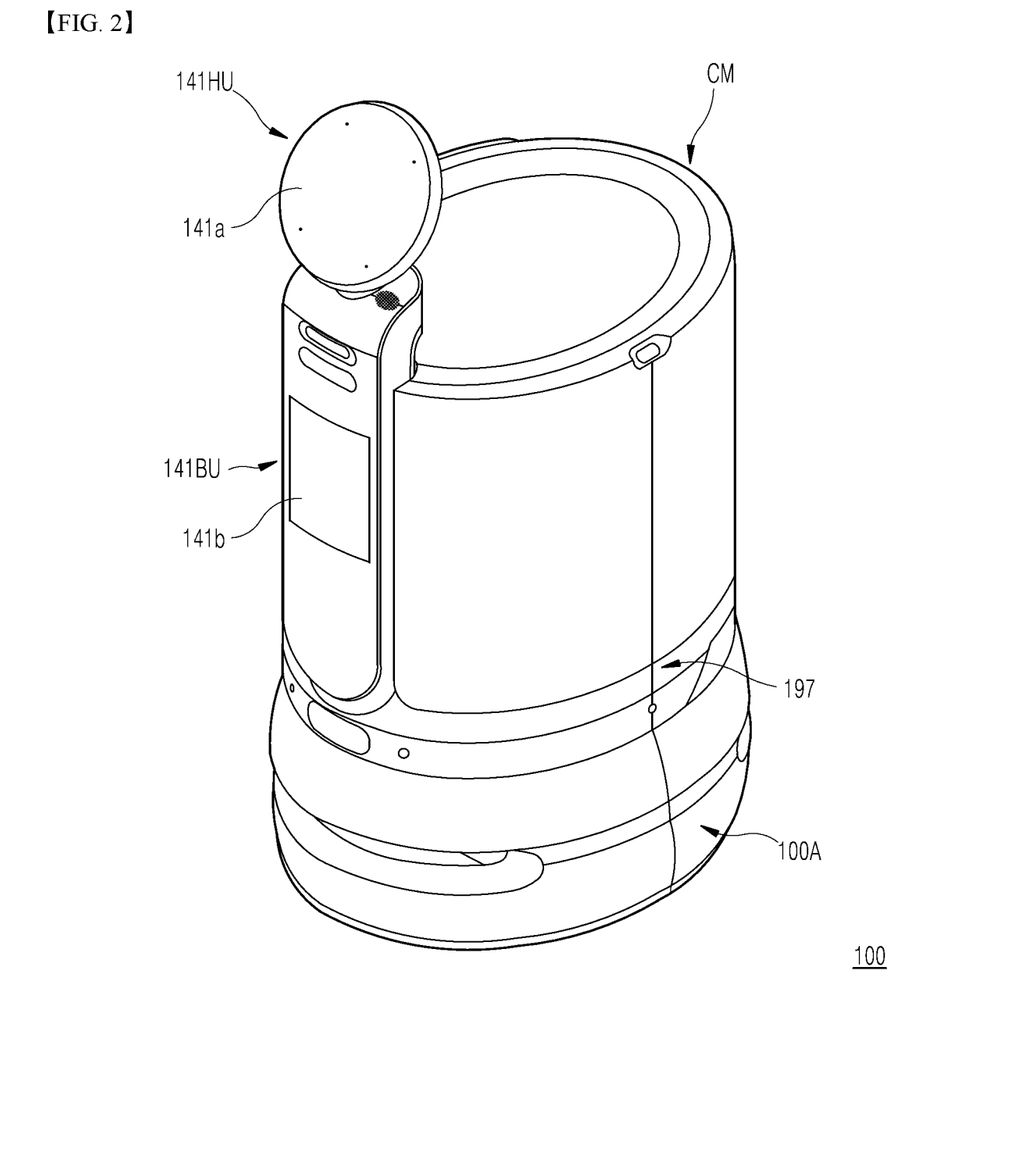
FIG. 2 is a perspective view illustrating a loading module and the delivery robot having the loading module, according to an embodiment of the present disclosure.
Figure 3:
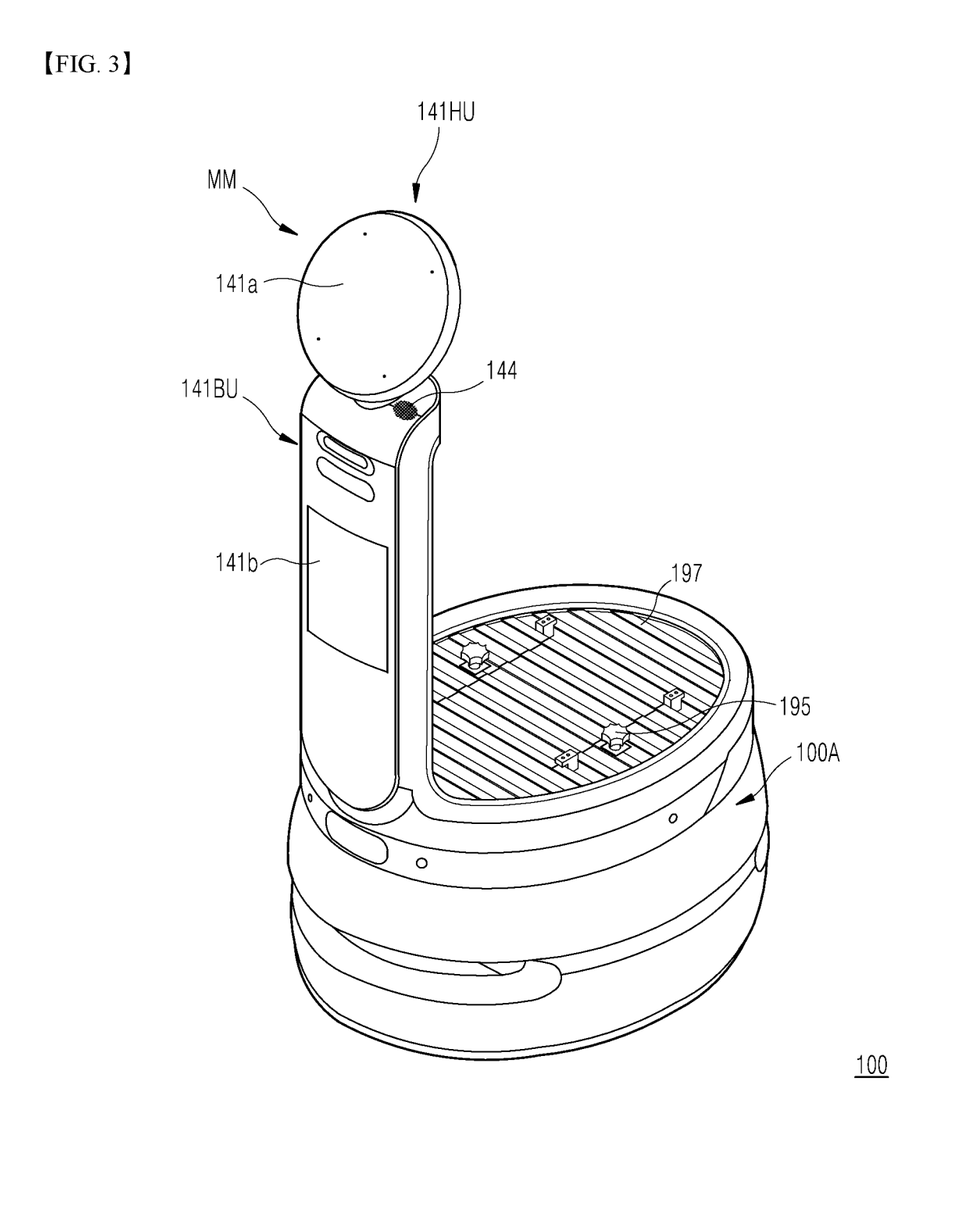
FIG. 3 is a perspective view illustrating a moving module of the delivery robot, according to an embodiment of the present disclosure.

Hereinafter, the forms of the delivery robot 100 and a moving module MM will be described with reference to FIGS. 2 and 3. FIG. 2 is a perspective view illustrating a loading module CM and the delivery robot 100 having the loading module CM according to an embodiment of the present disclosure. FIG. 3 is a perspective view illustrating the moving module MM carrying the loading module CM shown in FIG. 2.

The loading module CM of the present embodiment may be a module for loading articles at schools, corporations, hospitals, and the like, and may safely store articles according to the properties of the articles. The loading module CM may be loaded onto the moving module MM and, when the moving module MM moves, may move along with the moving module MM. Although the loading module CM is described as being separate from the moving module MM, the loading module CM may be implemented integrally with the moving module MM, depending on the embodiment.

When the loading module CM is coupled to the moving module MM, the combination of both may be a robot, which in turn may become the delivery robot 100 for delivering articles to customers.

Hereinafter, the moving module MM will be described first, and the loading module CM will be described later.

The moving module MM may include a main body 100A, a driving unit (including wheels), a module support plate 197, a display unit 141HU, a display unit 141BU, and a rotation mechanism. The main body 100A may constitute the body of the mobile module MM.

The module support plate 197 may be mounted on the upper surface of the main body 100A. The module support plate 197 preferably is shaped horizontally, but not limited thereto. The module support plate 197 may support the underside of the loading module CM. That is, the loading module CM may be seated on and supported by the module support plate 197.

The loading module CM may be removably mounted on the module support plate 197. The loading module CM may be an object carried by the moving module MM, wherein the loading module CM type is not limited. Accordingly, there is an advantage that different loading modules CM may be mounted on and used for one moving module MM.

A module fastening part 195 may ensure that the loading module CM is mounted firmly on top of the module support plate 197.

The display unit 141HU and the display unit 141BU may be disposed on the upper front side of the main body 100A. The display unit 141HU and the display unit 141BU may be disposed vertically. The display unit 141HU and the display unit 141BU may include a body display unit 141BU and a head display unit 141HU.

The body display unit 141BU may be formed integrally with the module support plate 197. In this case, the body display unit 141BU may be formed to extend upward from the front end of the module support plate 197. Alternatively, the body display unit 141BU and the module support plate 197 may be formed as separate members.

The height of the body display unit 141BU may be greater than that of the main body 100A. The body display unit 141BU may include a body display 141b on the front side thereof. The body display 141b may serve as an output unit for displaying a still or moving image. At the same time, the body display 141b may include a touch screen, thereby serving as an input unit capable of receiving touch input.

The body display unit 141BU may be positioned on the front of the loading module CM mounted on the module support plate 197. In this case, a depression corresponding to the shape of the body display unit 141BU may be formed on the front of the loading module CM, and the body display unit 141BU may be fitted into the depression. That is, the body display unit 141BU may guide the mounting position of the loading module CM. In addition, a sensor for recognizing the user's fingerprint, palm print, and the like, may be included in one area 144 of the body display unit 141BU.

The head display unit 141HU may be positioned on the upper portion of the body display unit 141BU. The head display unit 141HU may be rotatably attached to the upper portion of the body display unit 141BU.

More specifically, the head display unit 141HU may include a neck housing rotatably attached to the body display unit 141BU. The rotation mechanism may pass through the inside of the neck housing and allow the rotation of the head display unit 141HU.

The head display unit 141HU may include a head display 141a on the front side thereof. The head display 141HU may face forward or be tilted upward at a certain angle. The head display 141HU may display a still or moving image depicting a human expression. With this, the user may think that the head display unit 141HU resembles or mirrors a human head. In addition, the head display unit 141HU may display a notification message when the delivery robot 100 makes an urgent delivery of a specific article.

The head display unit 141HU may rotate, for example, 180 degrees, about the vertical axis of rotation to the left or the right, similar to a human head. The rotation mechanism may rotate the head display unit 141HU relative to the body display unit 141BU. The rotation mechanism may include a rotating motor and a rotating shaft rotated thereby. The rotating motor may be disposed inside the body display unit 141BU, and the rotating shaft may extend from the inside of the body display unit 141BU through the inside of the neck housing, and then connect to the head display unit 141HU.

Hereinafter, a structure of the loading module CM will be described with reference to FIGS. 4 to 7.

Figure 4:
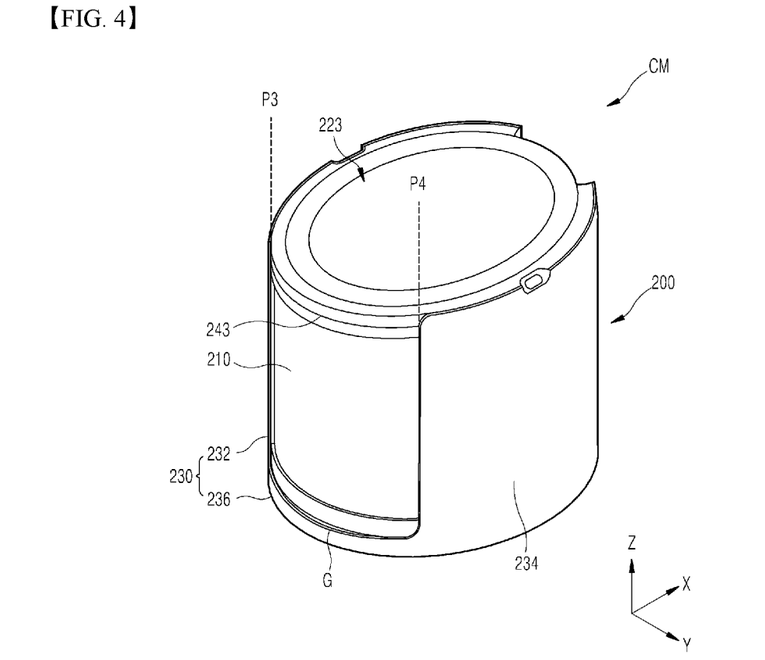
FIG. 4 is a perspective view illustrating an appearance of the loading module, according to an embodiment of the present disclosure.
Figure 5:
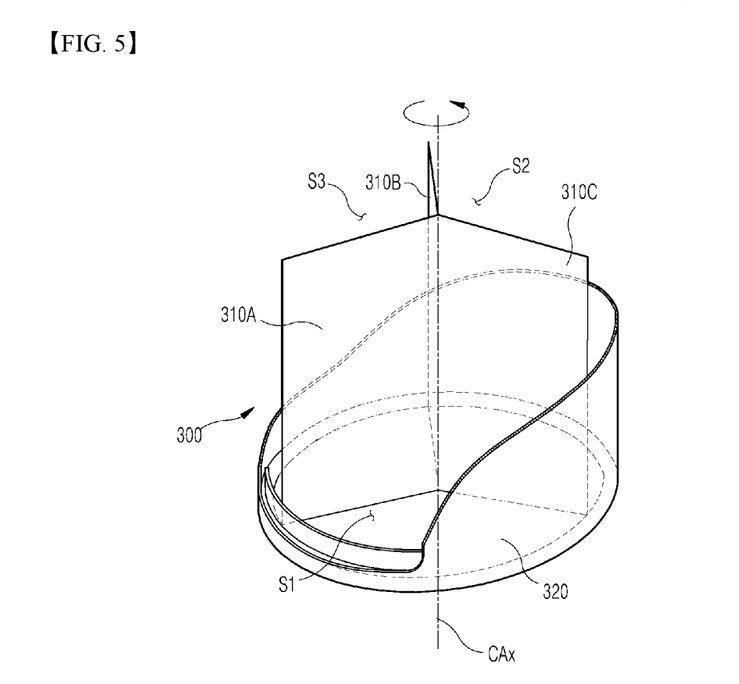
FIG. 5 is a perspective view of an article receiving portion positioned inside the loading module, according to an embodiment of the present disclosure.
Figure 6:
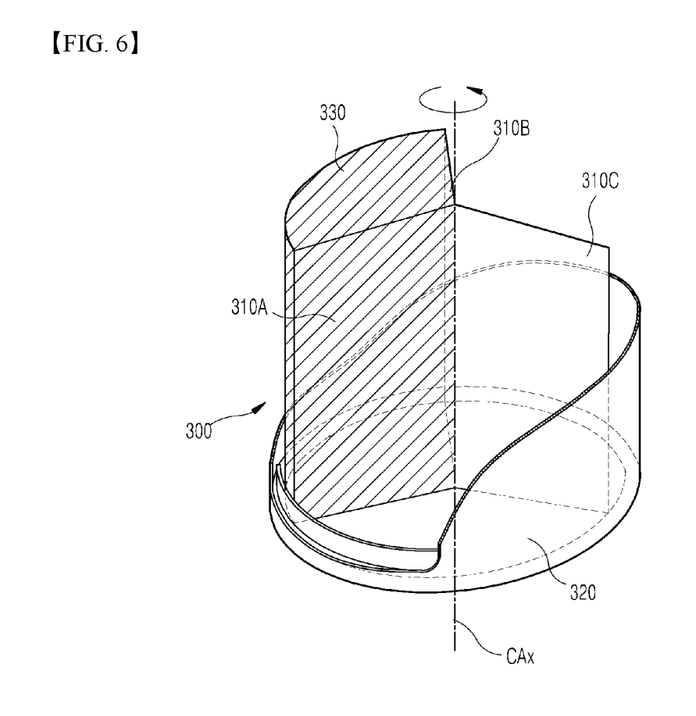
FIG. 6 is a perspective view of the article receiving portion including a housing having a receiving space therein, according to an embodiment of the present disclosure.
Figure 7:
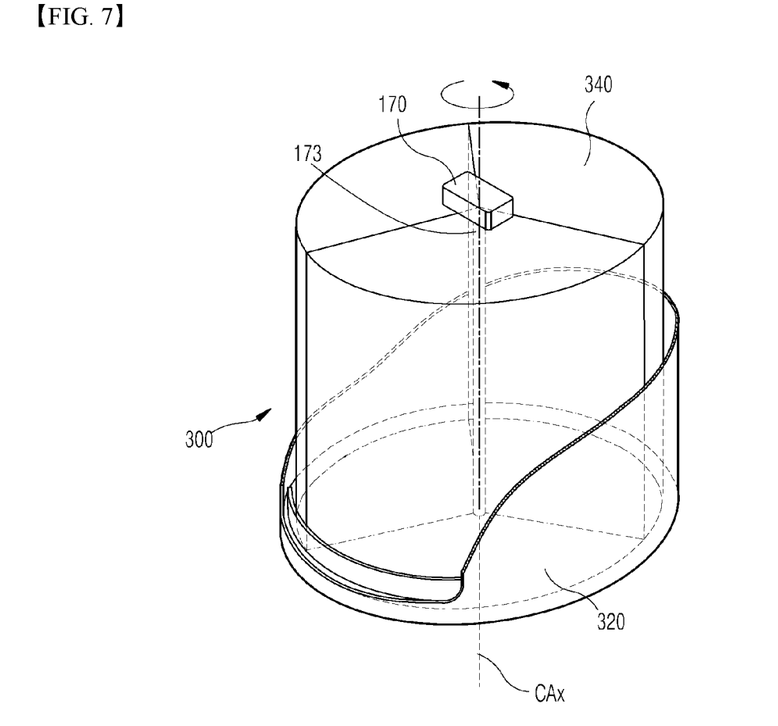
FIG. 7 is a perspective view of a structure for rotating the article receiving portion, according to an embodiment of the present disclosure.

FIG. 4 is a perspective view illustrating an appearance of the loading module CM according to an embodiment of the present disclosure. FIG. 5 is a perspective view of the article receiving portion 300 located inside the loading module CM according to an embodiment of the present disclosure. FIG. 6 is a perspective view of the article receiving portion 300 including a housing 330 which houses the receiving space according to an embodiment of the present disclosure. FIG. 7 is a perspective view of a structure for rotating the article receiving portion 300 according to an embodiment of the present invention.

The loading module CM may include a main body 200, the article receiving portion 300, and a door 210.

The main body 200 may form the appearance of the loading module CM. The main body 200 may have a body doorway G formed therein. The main body 200 may include an outer cover 230 which may surround the sides of the loading module CM to cover the inside thereof. The outer cover 230 may form an outer surface of the loading module CM. The outer cover 230 may include a left cover 232 forming the left side of the loading module CM and a right side cover 234 forming the right side of the loading module CM. The body doorway G may be formed to open horizontally between the left cover 232 and the right cover 234.

The outer cover 230 may further include a connecting body 236 coupling the left cover 232 and the right cover 234. The connecting body 236 may be an upper body which couples the upper portion of the left cover 232 and the upper portion of the right cover 234, or may be a lower body which couples the lower portion of the left cover 232 and the lower portion of the right cover 234.

An indicator 223 and an outer window 243 have a structure configured to transmit light emitted from a light emitting device, and may display various light emission patterns.

In addition, the control module 190 may cause the door driving unit 180 to be in a closed mode or in an open mode. The closed mode may be a mode in which the door driving unit 180 rotates the door 210 to a closed position P3 at which the body doorway G is completely blocked by the door 210. The open mode may be a mode in which the door driving unit 180 rotates the door 210 to an open position P4 at which the body doorway G is fully opened.

Referring to FIG. 5, the article receiving portion 300 for receiving articles may be formed in the main body 200. The article receiving portion 300 may be located inside the main body 200 and include one or more separating members 310A to 310C extending from a center axis CAx. Accordingly, a plurality of receiving spaces S1 to S3 may be formed between the separating members 310A to 310C. The article receiving portion 300 may include a lower plate 320 and an upper plate 340 (see FIG. 7) to which the separating members 310A to 310C are fixed.

The control module 190 may select, from among the receiving spaces S1 to S3, a receiving space in which an article is to be loaded, based on article information and destination information on the article which are inputted via the code input unit 125. The control module 190 may reveal the receiving space so that articles having a same destination are received in the same receiving space, taking into account the loading situation of the receiving spaces S1 to S3. Accordingly, misplacement of the articles or delivery errors may be prevented.

The control module 190 may cause the rotation driving unit 170 to position the selected receiving space in the direction of a door so that the selected receiving space is revealed to the outside of the loading module CM, and cause the door driving unit 180 to open the door.

In addition, when a specific article is loaded in a predetermined receiving space, the control module 190 may detect the weight of the loaded specific article via the weight detection sensor 133. The control module 190 may determine whether or not the article is loaded in each receiving space using the weight detection sensor 133 disposed for each receiving space. When the control module 190 determines that the article is loaded, the control module 190 may add, to a delivery list, article information, destination information on the loaded article, and information on the receiving space loaded with the article. The delivery list may further include information on the article sender and information on the article recipient.

In addition, the control module 190 may measure the weight of the articles loaded in the receiving space using the weight detection sensor 133. The control module 190 may store information on the total weight of the articles for each receiving space. The control module 190 may determine that a particular article has been successfully delivered to the article recipient when the total weight of the articles in a certain receiving space is reduced by the weight of the particular article after the particular article arrives at a destination, and then may delete information on the delivered article from the delivery list.

Referring to FIG. 6, the housing 330, separate from the outer cover 230, may be disposed inside the main body 200. The housing 330 may seal the receiving space. The housing 330 may provide a specific storage environment (e.g., temperature, humidity, illumination) with an article requiring the specific storage environment. The housing 330 may further include a drive circuit and a component for providing the specific storage environment.

In this case, when information on the article requiring the specific storage environment is inputted, the control module 190 searches for a receiving space having the specific storage environment among the receiving spaces. When the receiving space having the specific storage environment is found, the control module 190 causes the receiving space to be opened to the outside of the loading module CM. The receiving spaces comprise storing spaces.

The housing 330 may include a separate door interlocked with the opening and closing of the door 210 of the main body 200 so that the separate door opens when the door 210 is opened.

Referring to FIG. 7, the rotation driving unit 170, located on the center axis CAx of the upper plate 340 of the article receiving portion 300, may rotate the article receiving portion 300. A shaft 173 is formed in the direction of the central axis CAx passing through the article receiving portion 300 from the rotation driving portion 170. The shaft 173 may be fixed to the rotation driving unit 170 and driven by the rotation driving unit 170 to rotate the article receiving portion 300.

The rotation driving unit 170 may be disposed on the upper plate 340 or the lower plate 320, or both, of the article receiving portion 300. The shaft may be formed in the direction of the central axis CAx passing through the article receiving portion 300.

Figure 8:
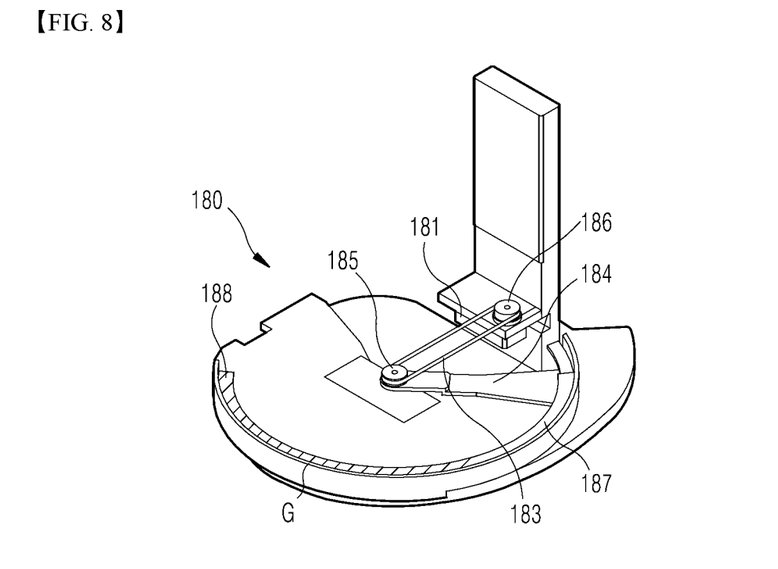
FIG. 8 is a perspective view of a structure for opening and closing a door of the loading module, according to an embodiment of the present disclosure.

FIG. 8 is a view for explaining a structure for opening and closing the door 210 according to an embodiment of the present disclosure.

The door 210 may be located in a predetermined area 188 on a door coupling body 187 and is a module for opening and closing the body doorway G.

The door driving unit 180 includes an electromotive door driving unit 181 and power transfer members 183, 185, and 186 connected to the electromotive door driving unit 181. The power transfer members 183, 185, and 186 may include a driving pulley 186 coupled to the electromotive door drive unit 181, a driven pulley 185 spaced apart from the driving pulley 186, and a belt 183 wound around the driving pulley 186 and the driven pulley 185.

The driving pulley 186 is disposed above the electromotive door driving unit 181, but may be disposed below the electromotive door driving unit 181, depending on the embodiment. The driving pulley 186 may be coupled to the rotary shaft of a door motor.

A rotor may include a driven pulley coupling body 184, which is coupled to the driven pulley 185, and may be coupled to the door coupling body 187.

Figure 9:
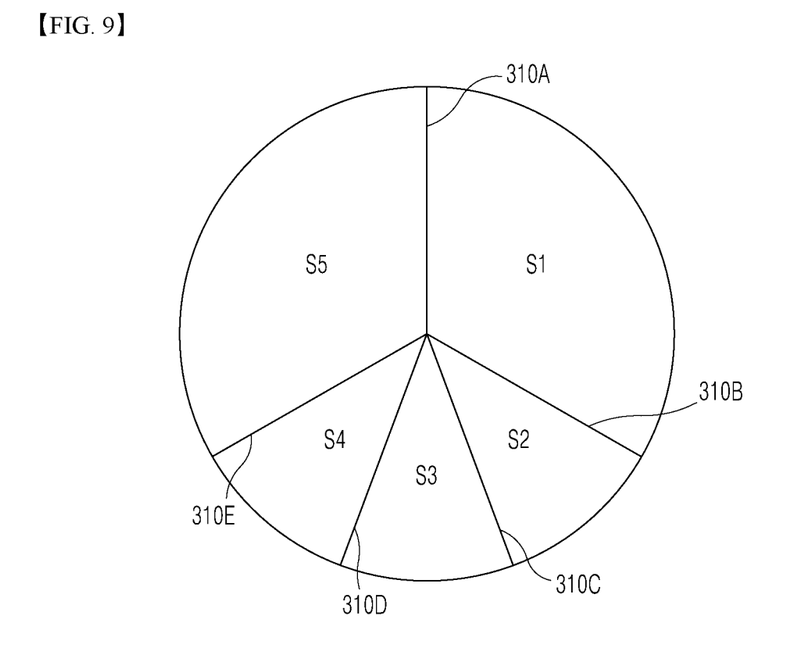
FIG. 9 is a view illustrating a receiving structure having five receiving spaces, according to an embodiment of the present disclosure.

FIG. 9 is a view for illustrating a receiving structure having five receiving spaces S1 to S5 according to another embodiment of the present disclosure.

Referring to FIG. 9, the plurality of receiving spaces S1 to S5 may be formed by a plurality of separating members 310A to 310E, and more or less receiving spaces may be formed depending on the embodiment. The plurality of receiving spaces may be formed to have the same area, may be formed to have different areas from each other, or may be formed so that some receiving spaces have the same area and other receiving spaces have different areas from each other. That is, the areas of the plurality of receiving spaces may be determined based on size information, shape information, form information, and number information on the separating members.

In addition, the receiving space may be formed as two or more levels, not as a single level, and each level may have different receiving space types. For example, the first level may include five receiving spaces and the second level may include three receiving spaces. The control module 190 may recognize all of the information on the receiving spaces in which the articles are loaded, and thus may manage information on the articles to be loaded or unloaded in each respective receiving space, information on destinations of the articles, and the like.

Figure 10:
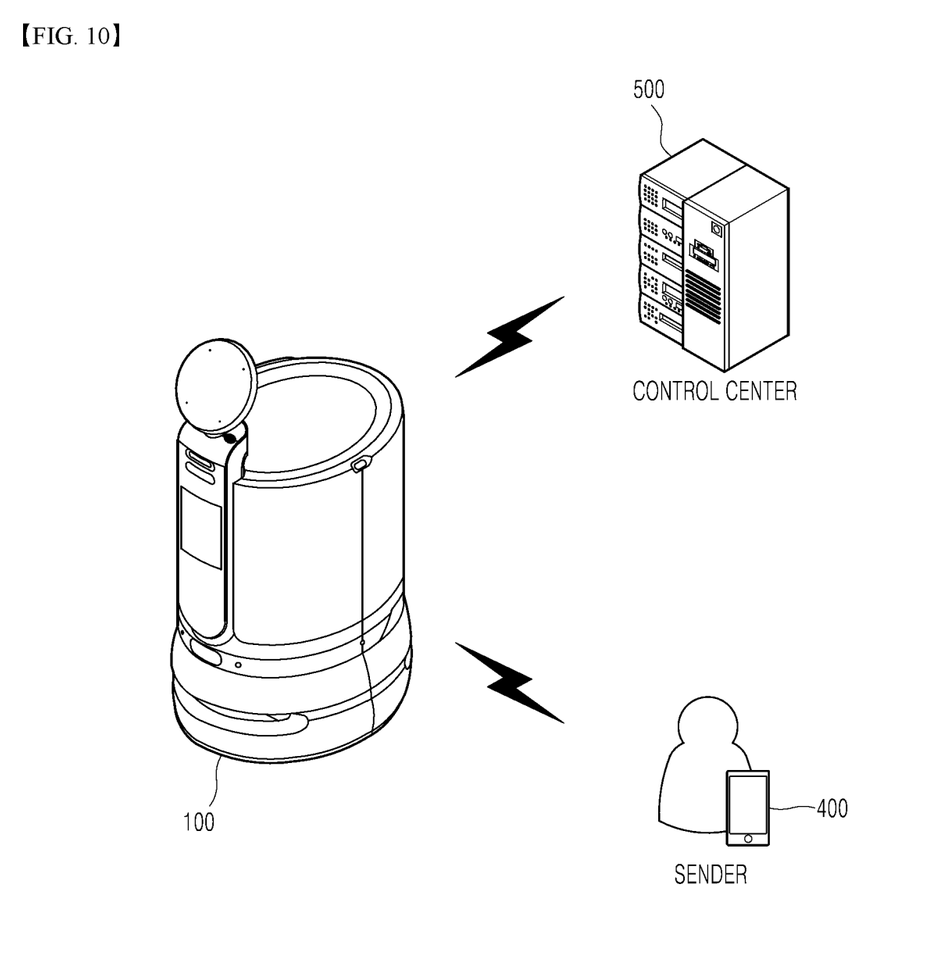
FIG. 10 is a view illustrating the delivery robot communicating with a control center and a mobile terminal, according to an embodiment of the present disclosure.

FIG. 10 is a view for illustrating the delivery robot 100 communicating with a control center 500 and a mobile terminal 400 within a control range of a sender according to an embodiment of the present disclosure.

Referring to FIG. 10, the control center 500 may regulate a specific region, an area, and the like, and may transmit an urgent command to the delivery robot 100. For example, the control center 500 may transmit a move command to the delivery robot 100 to load a specific article. The control center 500 may transmit a command to the delivery robot 100 to deliver a pre-received article to a specific place, first. In this case, the delivery robot 100 may move at a predetermined high speed while displaying a message indicating an emergency state on a display 141a of the head display 141HU.

The control module 190 of the delivery robot 100 may sort and store a delivery order of articles in ascending order based on at least one of information on the distance to a destination, information on the weight of an article, and information on an obstacle. The articles may be delivered according to the sorted delivery order. In some implementations, the control module 190 may be implemented a controller. In some implementations, the control module 190 comprises at least one of a controller or consists of at least one of a controller.

When an article to be delivered arrives at the destination thereof, the control module 190 may control the rotation driving unit 170 and the door driving unit 180 so that the receiving space in which the article to be delivered is loaded is revealed to the outside of the loading module 200.

When a specific article is a dangerous article, the control module 190 of the delivery robot 100 may receive information on an article sender and an article recipient via the input unit 120, and enter the information on the delivery list.

In this case, when the specific article arrives at the destination thereof and a separate consent command from the article sender is received, the control module 190 may control the rotation driving unit 170 and the door driving unit 180 so that the receiving space having the specific article loaded therein is revealed to the outside of the loading module 200.

Figure 11:
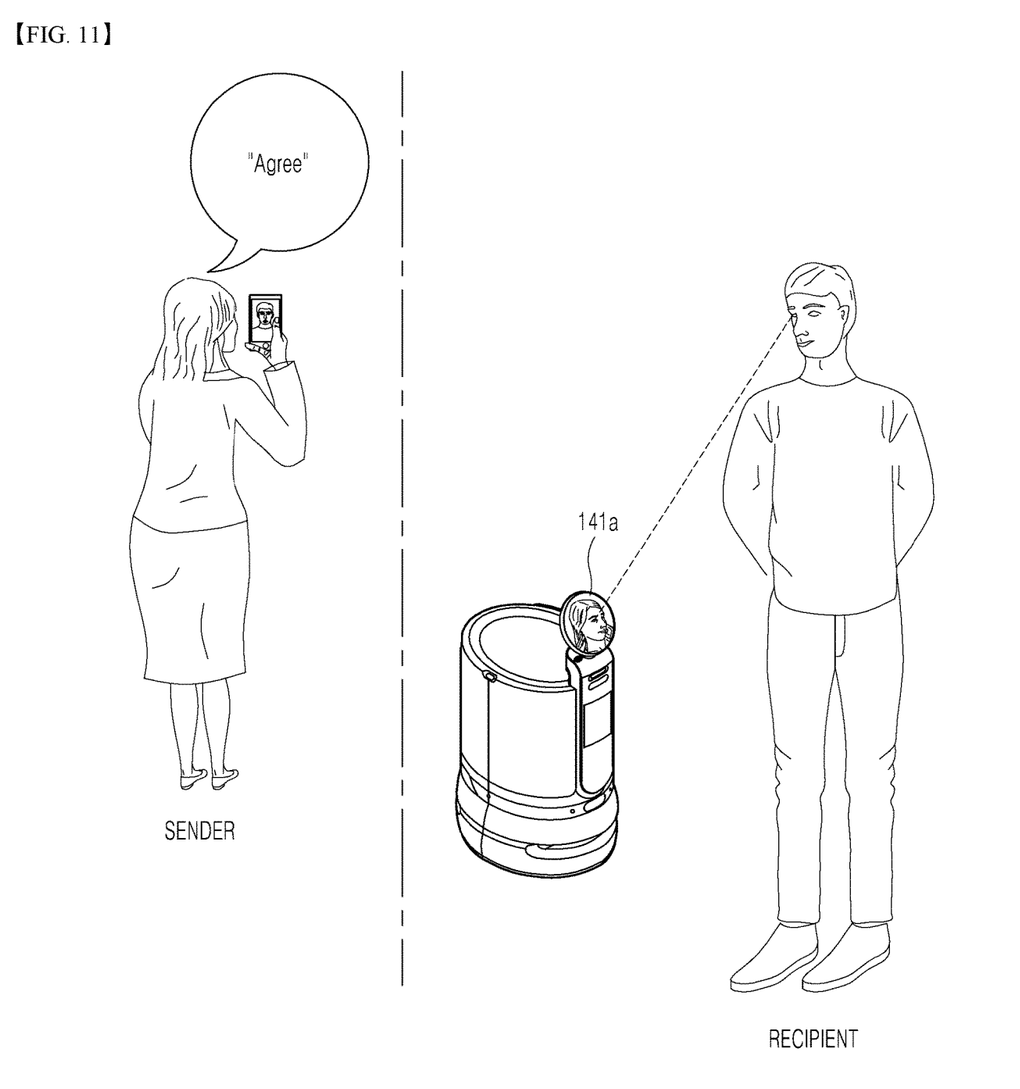
FIG. 11 is a view illustrating the delivery robot delivering an article via additional authentication, according to an embodiment of the present disclosure.

FIG. 11 is a view for illustrating a situation in which the delivery robot 100 delivering the dangerous article performs an additional authentication procedure, according to an embodiment of the present disclosure.

Referring to FIG. 11, the delivery robot 100 may deliver the dangerous article to the article recipient according to the request of the article sender.

In the case where a specific article is the dangerous article, when the specific article arrives at the destination thereof, the control module 190 of the carrying robot 100 may attempt to make a video call with a mobile terminal within a control range of the article sender.

When the video call is connected, the control module 190 may take an image of the article recipient and transmit the image to the mobile terminal of the article sender. An image of the article sender is displayed on the display 141a.

The control module 190 may reveal the receiving space of the specific article when receiving a separate consent command ("Agree") from the mobile terminal via the communication unit 110.

Figure 12:
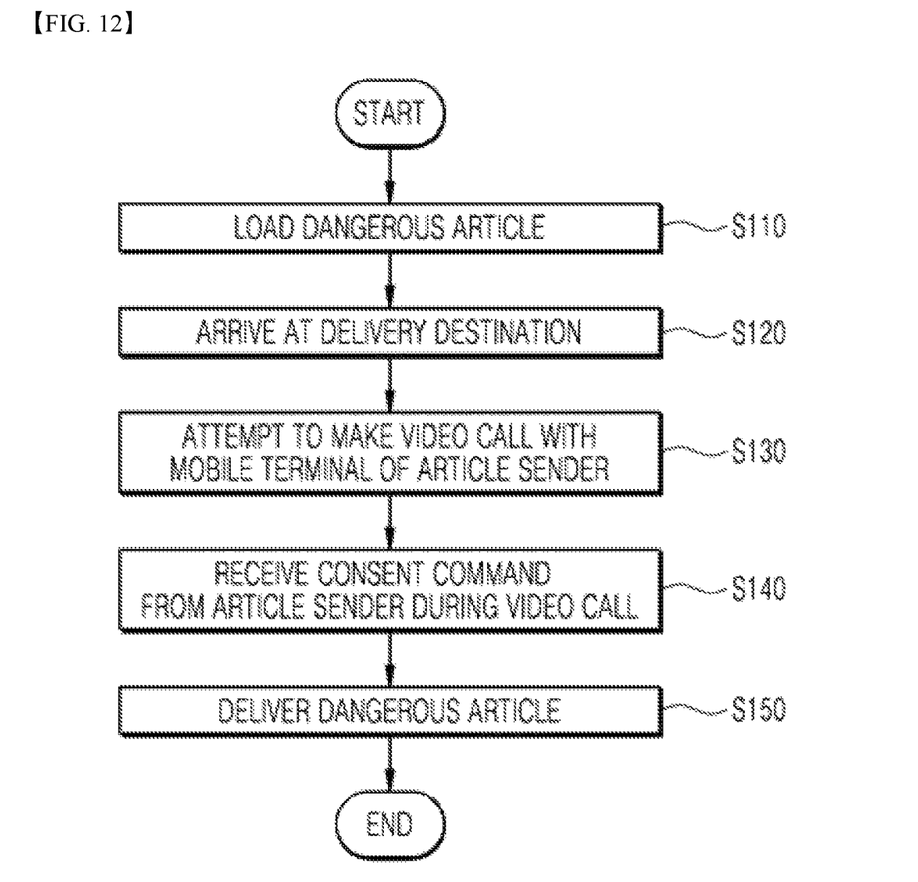
FIG. 12 is a sequence diagram of a method for delivering a dangerous article to an article recipient via the delivery robot, according to an embodiment of the present disclosure.

FIG. 12 is a sequence diagram illustrating a method for delivering the dangerous article to the article recipient via the delivery robot 100 according to an embodiment of the present disclosure.

Referring to FIG. 12, the dangerous article is loaded on the delivery robot 100 (S110).

When the delivery robot 100 identifies a code of a loaded article as a dangerous article code, the delivery robot 100 may recognize that the loaded article is the dangerous article, and open a special environment receiving space. The dangerous article is loaded in the special environment receiving space. The special environment receiving space corresponds to a receiving space having a specific temperature, humidity, illumination, and the like.

Then, the delivery robot 100 arrives at a delivery destination (S120) and attempts to make a video call with the mobile terminal of the article sender (S130).

When the control module 190 recognizes the article recipient as the article recipient approaches, the control module 190 may attempt to make a video call with the mobile terminal within a control range of the article sender.

Then, when the delivery robot 100 receives a consent command from the article sender during the video call (S140), the delivery robot 100 allows the dangerous article to be delivered to the article recipient (S150).

Here, the consent command may be generated by the voice of the article sender and may be transmitted to the delivery robot 100 via an application running on the mobile terminal.

Meanwhile, the present disclosure described above may be embodied as computer-readable code on a computer-readable medium. The computer-readable medium includes any type of recording device capable of storing data which may be read by a computer system. Examples of the computer-readable medium may include a hard disk drive (HDD), a solid state disk (SSD), a silicon disk drive (SDD), a ROM, a RAM, a CD-ROM, a magnetic tape, a floppy disk, an optical data storage device, and the like. Further, the computer system may include the control module 190 of the delivery robot 100.

Although specific embodiments of the present disclosure have been shown and described above, the present invention is not limited to the specific embodiments described, and those skilled in the art will appreciate that various modification and changes may be made therein, without departing from the scope and spirit of the present invention. Therefore, the scope of the present invention should not be limited by the embodiments described but should be determined by the technical idea described in the claims.

What is claimed is:

1. A delivery robot equipped with a loading module, comprising:
   one or more sensors;
   an inputter configured to receive article information and receive destination information on an article;
   a memory configured to store a delivery list; and a controller,
wherein the loading module comprises:
  an article storing portion which comprises one or more separating members extending in a circumferential direction from a central axis and a plurality of storing spaces formed by the separating members;
  a main body in which the article storing portion is located and a body doorway is formed;
  a rotation driver configured to rotate the article storing portion;
  a door configured to open and close the body doorway; and
  a door driver connected to the door to open and close the door,
wherein the controller is configured to:
  select, from among the storing spaces, a storing space in which the article is to be loaded, based on the article information on the article and the destination information on the article which are inputted; and
  cause the rotation driver and the door driver to reveal the selected storing space,
wherein the inputter comprises a code inputter,
wherein the controller is configured to recognize the article information on the article and the destination information on the article, which are inputted via the code inputter,
wherein information on an article requiring a specific storage environment is inputted via the code inputter and a storing space for providing the specific storage environment is in the loading module, the controller causes the rotation driver and the door driver to reveal the storing space for providing the specific storage environment, and
wherein the controller is configured to cause the rotation driver and the door driver to reveal a storing space so that articles having a same destination are stored in the same storing space.

2. The delivery robot according to claim 1, wherein the controller reveals a storing space in which a pre-loaded article is located when the inputted destination information on the article matches destination information on the pre-loaded article.

3. The delivery robot according to claim 1,
wherein the sensors comprise a weight detection sensor, and
wherein when a specific article is loaded in a predetermined storing space, the controller measures a weight of the loaded specific article using the weight detection sensor.

4. The delivery robot according to claim 3, wherein the controller determines whether or not the article is loaded based on the weight of the article loaded in the predetermined storing space, and the controller adds, to the delivery list, at least one of information on the loaded article, destination information on the loaded article, or information on the predetermined storing space loaded with the article when it is determined that the article has been loaded.

5. The delivery robot according to claim 1, wherein when the article arrives at a destination, the controller causes the rotation driver and the door driver to reveal the storing space in which the article is loaded.

6. The delivery robot according to claim 5, wherein the controller is configured to determine that the article has been successfully delivered to a recipient and update the delivery list when a total weight of the articles in the storing space is reduced by a weight of the article arriving at the destination.

7. The delivery robot according to claim 1, wherein the delivery list comprises at least one of information on the article, destination information on the article, or information on the storing space in which the article is loaded.

* * * * *